United States Patent [19]

Aboul-Nasr

[11] Patent Number: 4,934,433

[45] Date of Patent: Jun. 19, 1990

[54] DEVOLATILIZATION

[75] Inventor: Osman T. Aboul-Nasr, Leominster, Mass.

[73] Assignee: Polysar Financial Services S.A., Fribourg, Switzerland

[21] Appl. No.: 271,636

[22] Filed: Nov. 15, 1988

[51] Int. Cl.[5] .......................... B01D 1/00; B29D 7/00
[52] U.S. Cl. .................................... 159/43.1; 159/46; 159/47.1; 159/DIG. 10; 159/DIG. 16; 264/102; 425/72.1; 425/72.2; 528/501
[58] Field of Search ............... 159/43.1, DIG. 10, 2.2, 159/46, DIG. 4, DIG. 16, 47.1; 528/501; 264/101, 102; 425/72.1, 72.2

[56] References Cited

U.S. PATENT DOCUMENTS

| | | | |
|---|---|---|---|
| 2,583,364 | 1/1952 | Eckstrom | 159/43.1 |
| 3,057,786 | 10/1962 | Waddill | 159/43.1 |
| 3,132,064 | 5/1964 | Scheffers | 159/43.1 |
| 3,149,056 | 9/1964 | Longstreth et al. | 159/43.1 |
| 3,177,127 | 4/1965 | Longstreth | 159/43.1 |
| 3,436,792 | 4/1969 | Hench | 425/72.2 |
| 3,477,094 | 11/1969 | Maahs et al. | 159/DIG. 10 |
| 3,825,379 | 7/1974 | Lohkamp et al. | 425/72.2 |
| 3,966,538 | 6/1976 | Hagberg | 159/DIG. 10 |
| 4,032,391 | 6/1977 | Moked et al. | 159/DIG. 10 |
| 4,071,307 | 1/1978 | Porro | 425/72.2 |
| 4,123,208 | 10/1978 | Klaver et al. | 425/72.2 |
| 4,153,501 | 5/1979 | Fink et al. | 159/DIG. 10 |
| 4,294,652 | 10/1981 | Newman | 159/2.1 |
| 4,298,322 | 11/1981 | Anders et al. | 264/102 |

Primary Examiner—Virginia Manoharan
Attorney, Agent, or Firm—Stevens, Davis, Miller & Mosher

[57] ABSTRACT

The efficiency of falling strand devolatilizers is related to a number of factors incluidng the foaming of the polymer melt and the time the melt in both foam and strand form is held in the devolatilizer. The level of residual material including monomers, dimers, trimers, and diluents, in a polymer melt may be reduced by passing the melt sequentially through a preheater operated at relatively low pressure then through a horizontal melt distributor at the top of a devolatilizer chamber.

10 Claims, 3 Drawing Sheets

1

DEVOLATILIZATION

BACKGROUND OF THE INVENTION

This invention relates to a process and an apparatus for devolatilizing polymer melts and more particularly the apparatus of the present invention is a polymer melt distributor for use within a reduced pressure devolatilizer.

In the manufacture of certain polymers, such as impact and crystal polystyrene, residual material including monomers, solvents or diluents such as ethyl benzene, and low molecular weight oligomers such as dimers and trimers may be present in the polymer coming out of the reactor. It is important to remove at least a major proportion of these residual materials from the polymer. Generally the polymer melt is passed through a preheater at high pressures and temperatures into a devolatilization chamber maintained at a high temperature and a low pressure. The residual materials then tend to diffuse through the polymer and escape to the surrounding atmosphere in the chamber, resulting in a polymer with a lower level of such residual materials.

The degree of removal of the residual materials depends on a combination of one or more of temperature, pressure, diffusion rate of residual materials through the melt, surface area of the melt, the extent of bubble formation within the melt and residence time of the melt in the devolatilization chamber.

In the prior art one approach to maximize the surface area of the polymer melt is to flow the polymer melt vertically down the surface of a plate heat exchanger as disclosed in U.S. Pat. No. 4,153,501 issued May 8, 1979.

A second approach is to use a series of falling strand devolatilizers as disclosed in U.S. Pat. No. 4,294,652 issued Oct. 13, 1981. A series or sequential devolatilizer permits the temperatures to be adjusted to increase devolatilization of the residual materials. While series devolatilizers are useful, they represent additional capital, operating and maintenance costs over single stage devolatilizers.

It is believed that one of the limiting factor in falling strand devolatilizers is the dwell time of the polymer in the form of a strand (e.g. the time it takes for a polymer to descend down a strand). Increasing temperature would increase the diffusion rate and bubble formation, however, the dwell time of the polymer in the strand would decrease due to lower polymer viscosity. Thus, there is a point of diminishing return in heating the melt, not to mention the problem of polymer degradation.

What is needed is a method to increase bubble formation and to hold the polymer melt in a devolatilizer for a slightly longer period of time in a condition such that a large surface area of polymer is available for devolatilization of the residual materials. Preferably the polymer melt would be in the form of a foam to increase the surface area of the melt.

SUMMARY OF THE INVENTION

It is an object of the present invention to provide an improved process and apparatus for reducing the volatile residual material in a polymer melt.

The present invention provides a horizontal polymer melt distributor adapted to be used in the upper end of a reduced pressure devolatilizer, said distributor comprising:

an inlet means comprising a die assembly adapted to cooperate with and receive polymer melt from a preheater, said die assembly comprising two oppositely facing flange plates connected about a central die plate, said flange plates having essentially equisized central openings therethrough having an inward taper towards said die plate, said die plate bearing a number of holes therethrough connecting the central openings through said flange plates, the total cross sectional area of said holes being less than the minimum cross sectional area of the central openings through said flange plates, a heated enclosed first section having a cross sectional area greater than the minimum cross sectional of said inlet, said first section opening into one or more subsequent at least partially heated venting and distributing sections which bear on their upwardly facing surface at least one aperture and on their downwardly facing surface strand forming holes permitting the exit of said polymer melt at a rate substantially equal to the rate polymer melt enters said distributor, the total cross sectional area of said one or more subsequent sections being at least equal to the cross sectional area of said first section, said first and subsequent sections being adapted so that a substantially linear flow of polymer melt is maintained through out said distributor with no stagnant areas.

The present invention also provides a process for devolatilizing a polymer melt which comprises passing said polymer melt through a preheater into a devolatilizer wherein the preheater is operated at temperatures and pressure conditions such that the vapor pressure of residual monomer, dimers, trimers, and diluents if present, is greater than the pressure within the preheater.

Preferably the process is used in conjunction with the above polymer melt distribution means.

BRIEF DESCRIPTION OF THE DRAWINGS

Preferred embodiments of the invention will be further described, by way of illustration only, with reference to the following drawings in which.

DETAILED DESCRIPTION OF THE INVENTION

Figure 1:
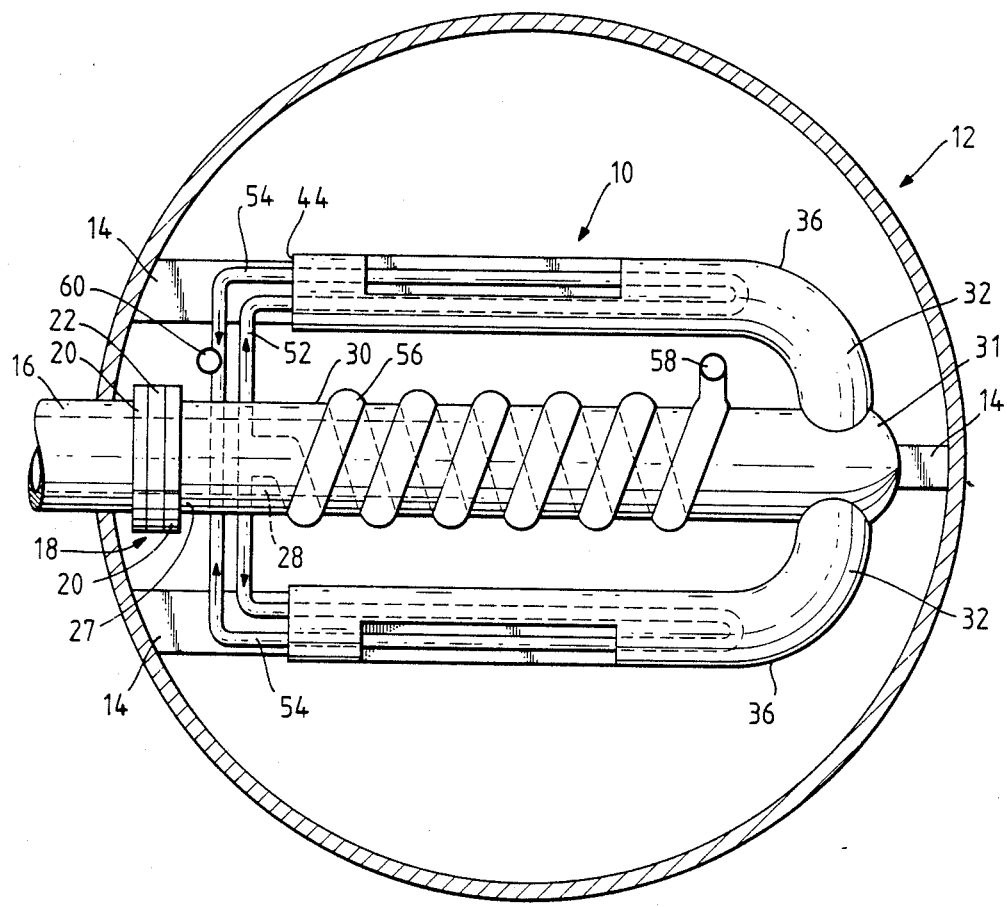
FIG. 1 is a schematic representation of a top view of a melt distributor.

In the bulk polymerization of polystyrene in the prior art a mixture of monomer and optionally diluent, such as ethyl benzene, is polymerized to a controlled conversion at temperatures of about 150° C. The material exiting the reactor may contain up to 30% of monomer, oligomers, and diluent. The mixture leaving the reactor is passed through a preheater or heat exchanger, usually a shell and tube type heat exchanger up to temperatures of a maximum of 255° C. preferably up to 240° C. most preferably about 230° C. A high pressure pump is usually used to force the melt through the heat exchanger. The polymer than leaves the preheater and enters the devolatilization chamber. The devolatilization chamber is operated at temperatures up to about 255° C. and pressures from about 1 to 50, preferably about 5 to 25 mm of Hg. As the hot melt flows out of the preheater in strands into the devolatilization chamber, it foams and the volatile residual materials are flashed off. The melt then descends to the bottom of the devolatilizer where it collects in a pool and is pumped to the next process stage.

Preferably in accordance with a further aspect of the present invention there is provided a process for devolatilization of a polymer melt in which the preheater is operated at temperature and pressure conditions so that the pressure within the preheater is less than the vapor pressure of the residual materials in the polymer melt such as monomers, dimers, trimers, oligomers, and diluent. It is believed that the melt starts to effervesce or froth with some of the residual materials forming a discontinuous vapor phase within the continuous polymer melt which are believed to be sites for further bubble formation. The pressure of the polymer melt within the preheater is controlled by a pump and by the number and diameter of the holes in the die plate at the inlet to the devolatilizer. The pressure in the preheater is controlled such that a substantial amount of residual monomer and diluent evaporate in the preheater. The polymer phase of the melt entering the devolatilizer through the die plate will have a volatile content of 2 to 10, preferably 3 to 7 percent. The pressure of the polymer melt in the preheater in accordance with a preferred method of using the distributor, is from 10 to 30 preferably about 20 to 30 psig., most preferably about 24 to 28 psig. at temperatures up to 255° C., preferably from about 220° to 240° C. Care must be taken that the polymer is not exposed to too high a temperature for excessive time or degradation and/or a oligomerization may tend to occur. The polymer melt flows from the preheater into a horizontal distribution means at the upper end of the devolatilization chamber.

The distributor comprises a horizontal inlet from the preheater to receive polymer melt. The first section is enclosed and heated having a cross sectional area greater then the minimum cross section area of inlet which permits the polymer melt to expand and foam. The first section has a cross section area greater than the minimum cross section areas of the inlet (e.g. the cross section area of holes through the die plate). Preferably the first section is in the form of a tube or barrel. The expansion of the polymer melt is due to the reduced pressure within the devolatilizer relative to the pressure in the preheater. The polymer melt expansion provides a larger surface area to permit residual material to volatilize into and also from the foam structure into the devolatilization chamber. The second stage of the distributor comprises one or more subsequent partially heated venting and distribution sections.

The total cross sectional area (e.g. number and area) of the subsequent sections should be equal to or greater than that of the first section, preferably from 1.2 to 1.7 times the cross sectional area of the first section. The one or more subsequent sections must have a configuration that will fit within the upper end of the devolatilization chamber. The subsequent sections may be coiled or serpentine. The subsequent sections may split and turn back along the first section forming a trident (e.g. "M" shape), an annulus or a partial annulus. In designing the subsequent sections care should be taken to avoid designs which have areas of low linear flow or stangnent flow. Thus, curves are preferred over square elbows.

Without being bound by theory it is believed that the principle of operation is as follows.

The pressure of the melt drops gradually in the preheater until the volatile materials start to effervesce or boil. The pressure drop across the die plate is such that the polymer melt phase leaves the die plate containing 2 to 10, preferable 3 to 7 percent volatiles. The vapors formed in the preheater disengage from the melt, as the melt and entrained vapor crosses the die plate. The remaining volatile materials in the melt start to boil forming foam, which enhances further devolatilization through the increased surface area of the melt. As the foam flows along the first section of the devolatilizer the vapor disengages from the foamed melt and escapes through the venting sections or apertures in the subsequent one or more sections of the devolatilizer. The melt then flows in strands through strand forming holes to the bottom of the devolatilizer. The final stage of devolatilization take place from the polymer melt strands and pool in the bottom of the devolatilizer.

If the pressure in the preheater is too low, too much of the volatile material in the melt will form the vapor phase. There will not be sufficient volatile material in the melt to froth the melt sufficiently for efficient devolatilization.

If the pressure in the preheater is too high, too much volatile material will be in the polymer phase as the melt cross the die plate. This is detrimental in two ways. First, the dwell time may not be sufficiently long for adequate devolatilization. Secondly, as the volatiles evaporate, they will extract heat from the melt lowering its temperature reducing the diffusion coefficient and increasing the viscosity of the polymer melt. The lower diffsion coefficient retards the devolatilization process while the higher viscosity retards the seperation of the vapor bubbles from the melt. If the vapor bubbles do not separate from the melt they may be compressed and condensed by the melt pump at the bottom of the devolatilizer and will raise the concentration of residual volatile material in the polymer.

In the subsequent section(s) the bubbles within the foamed polymer melt will tend to burst open permitting the volatile residual materials to be drawn off through the devolatilization chamber.

The venting and distribution section have apertures cut in their upward facing surfaces. Preferably the apertures extend longitudinally along the upward facing surface of the subsequent sections. Preferably the apertures are located on the surfaces facing the wall or inner surface of the devolatilization chamber. The apertures permit the devolatilization of the bubbles from the melt and from the surface of the melt. The apertures should run at least about 50%, preferably 60–80%, most preferably 65 to 75% of the length of the subsequent section. The downward facing surface of the subsequent sections have strand forming holes in them through which the polymer melt flows and descends as strands to the bottom of the devolatilizer. The selection of hole size and location to produce strands is known to those skilled in the art. In addition to the strand forming holes and the apertures the subsequent sections may contain a series of overflow holes about half way up the side of each section to reduce the risk of the polymer melt overflowing out of the apertures.

The first section must be heated. A hot oil jacket or coil is preferred but other heating means may be used if desired. The subsequent sections may be at least partially heated. The subsequent sections are open at the apertures so the preferred heating means is internal such as a bayonet heater. The temperature of the distributor should be up to 250, preferably from 230° to 250° C., most preferably from 240° to 250° C.

The first and subsequent sections should be of a shape so that there is essentially linear flow within the distributor. The distributor must provide a suitable residence time and fit within the devolatilizer. The temperature, pressure and polymer residence time in the devolatilizer will control the degree of devolatilization of the polymer. Under typical pressures and temperatures in a devolatilizer the residence time in the distributor may be up to about 10 minutes, preferably from about 3 to 8 minutes, most preferably about 5 minutes. Preferably, sharp elbows or joints in the distributor where there would be low polymer flow rates are avoided. The preferred structures are annular, serpentine, toroidal and trident (e.g. an m shape).

A die plate serves to maintain the pressure drop from the preheater to the distributor in the devolatilizer. This permits the preheater to be maintained at pressures of 10 to 30 psig while the devolatilizer is maintained at pressures as low as about 1, preferably 5 to 25 mm of Hg. The total cross section area of the holes in the die plate should be less than the cross section area of the first section. Preferably the ratio of cross section area of the holes through the die plate to the cross section area of the first section is in the range of 1:5 to 1:10. Preferably the holes are tapered or at least partially tapered reducing in size in the direction of flow of the polymer melt. The die may be mounted at the distributor inlet between a pair of equisized flange plates having central openings therethrough having an inward taper towards the die plate.

The apparatus aspect of the present invention will be more fully described in accordance with the drawings in which the distributor is in the shape of a trident.

Referring to FIG. 1, it can be seen that the trident shaped polymer melt distributor 10 is supported horizontally within a devolatilization chamber 12 by support plates 14. A polymer melt inlet 16 passes through the side of the chamber 12 and is connected to the distributor through die assembly 18.

Figure 2A:
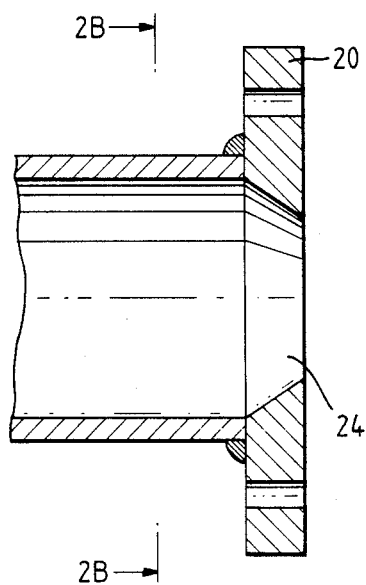
FIG. 2A is a cross sectional side view of a flange assembly for use in the distributor of FIG. 1.
Figure 2B:
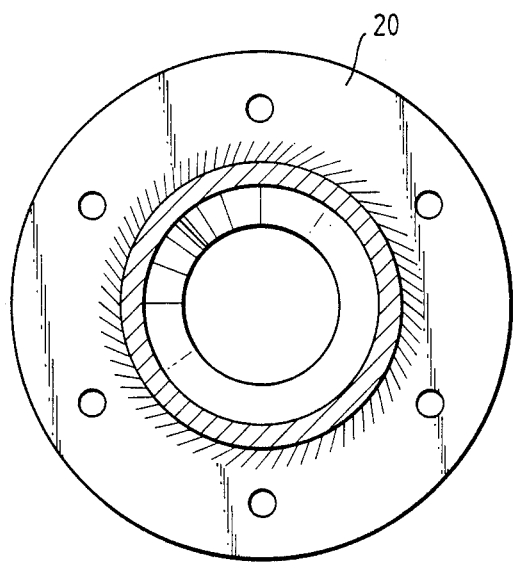
FIG. 2B is a forward view along section 2B—2B of FIG. 2A.
Figure 3A:
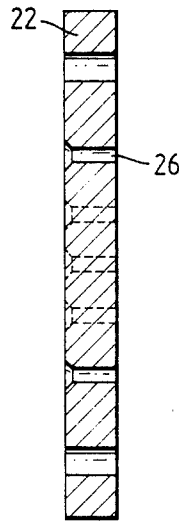
FIG. 3A is a cross sectional side view of a die plate.
Figure 3B:
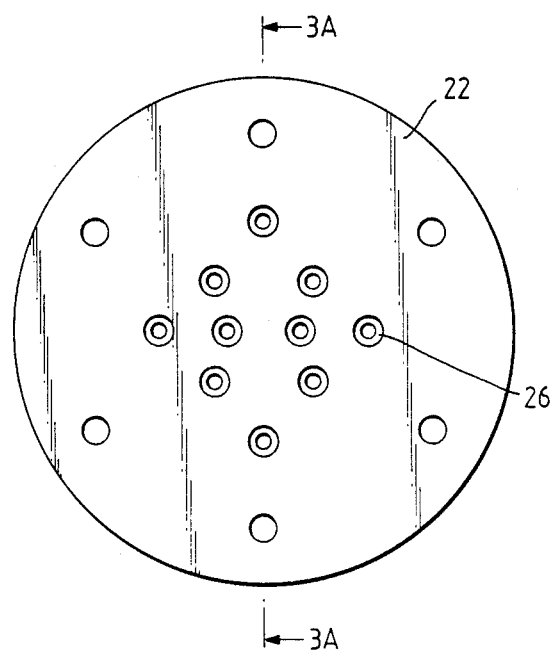
FIG. 3B is a front view of the die plate of FIG. 3A.

The die assembly 18 comprises a pair of flange plates 20 with a die plate 22 disposed therebetween. FIGS. 2A and 2B sectional and back views of the flanges respectively, show the flange plates each have an inwardly tapered opening 24 there through (e.g. they narrow toward the face of the flange or the die plate). FIGS. 3A and 3B are sectional and front views of the die plate and show that the die plate 22 has a plurality of tapered holes 26 therethrough. The holes are tapered in the direction of flow of polymer melt into the distributor. The number and diameter of holes are selected to maintain the pressure on the polymer melt within the preheater and to control the flow of the polymer melt into the distributor.

Connected at one of its ends 27 to the die assembly is a central passage 28 defined by a pipe or barrel 30. At its other end 31, the central passage 28 is connected by a pair of elbows 32 to return passages or tines 36. These return passages 36 extend parallel to the central passage 28 in the opposite direction to the central passage 28.

Figure 4A:
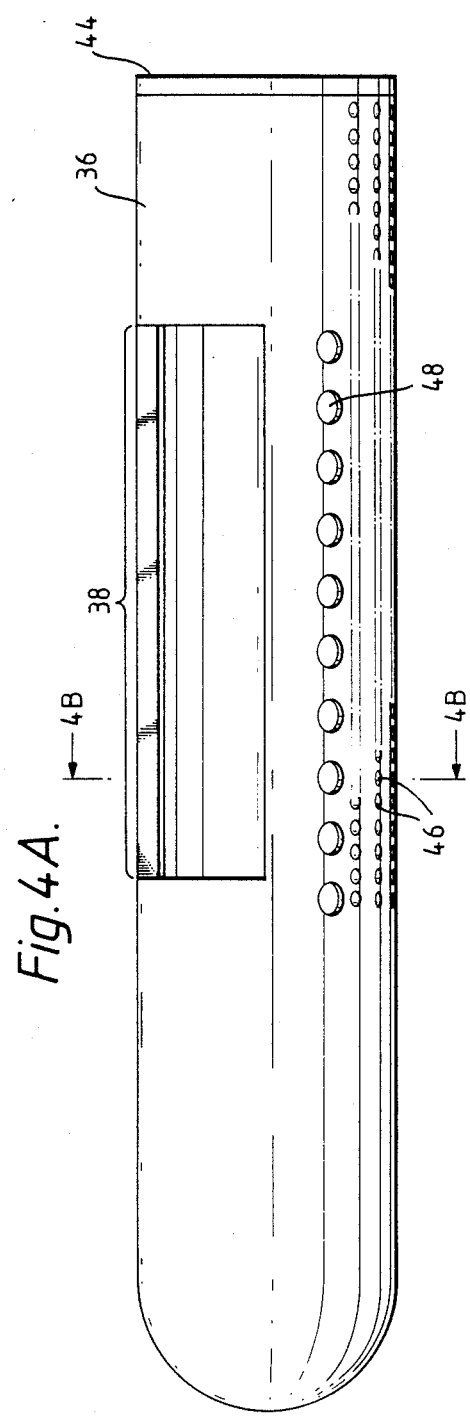
FIG. 4A is a side view of an outer arm of the distributor of FIG. 1.
Figure 4B:
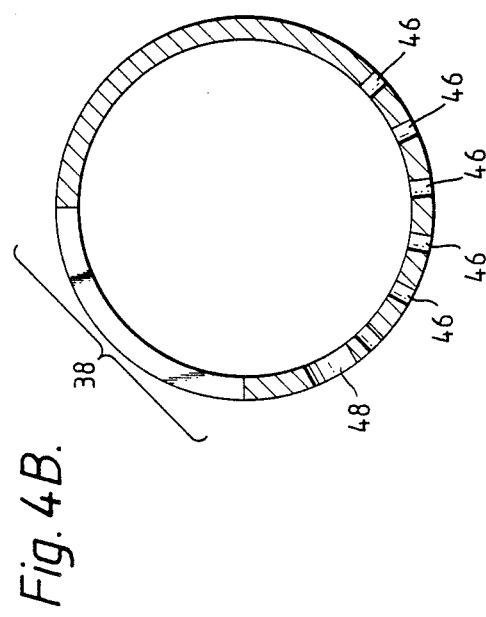
FIG. 4B is a forward view along section 4B—4B of FIG. 4A.

Details of the return passages can be seen in FIGS. 4A and 4B which show a single return passage 36. The upward top quarter of each tine (facing out from the central passage (e.g. toward the interior wall of the devolatilizer) 36 is cut out to provide an aperture or gas outlet 38 spaced from the closed end 44 of the tine. Located in the downward facing surface of tine 36, are a plurality of polymer outlets 46. Generally, the size, number and configuration of outlets are selected to allow formation of substantially equisized continuous strands of polymer which flow to the bottom of the devolatilization chamber. The size of the outlets is selected so that the polymer melt flow is substantially equivalent with the polymer melt flowing into the distributor under steady state conditions.

A single row of relatively large level control or overflow holes 48 are located in the side of the tine between the strand forming holes and the aperture. Preferably these holes are between $\frac{1}{2}$ and $\frac{3}{4}$ of the way from the bottom of the tine to the aperture. As seen in FIG. 1, a tubular bayonet heater comprising inlet pipe 52 and outlet pipe 54 extends into tines 36, an associated coiled heater 56 surrounds the pipe or barrel 30 of the central passage 28. Heating oil is provided to the heater through an inlet 58 and is removed through an outlet 60. If desired, the coil heater 56 could be replaced with a jacket heater.

The apparatus of the invention can be used with substantially any type of polymer which requires devolatilization to remove residual materials therefrom. It is particularly useful in the devolatilization of impact and crystal polystyrene to remove residual styrene monomers, and possibly some dimers and trimers of styrene therefrom.

The use of the preferred distributor in accordance with the present invention is as follows. Polymer melt, which is preheated at temperatures up to 250° C. at pressures from 10 to 30 psig is passes through the die assembly 18. The pressure starts dropping as the melt enters each of the orifices in the die plate 22, and the melt will attain a pressure close to the pressure in the devolatilization chamber 12 upon exiting from the die. Frothing and expansion of the polymer melt increases as the pressure of the melt reaches the pressure within the devolatilizer. The melt flows along the central passage 28 and splits into two streams which flow through respective tines 36. Gaseous residual materials escape through apertures 38 and the melt flows through outlets 46 resulting in substantially continuous strands of polymer which descend to the base of the devolatilizer in a pool of polymer melt. Devolatization of the melt continues as the strands of melt descend to the bottom of the devolatilizer. The residence time of the polymer in the strand form (e.g. the time for the polymer to flow to the pool of polymer melt in the bottom of the devolatilizer should be less than about 5 minutes, preferably about 2 to 3 minutes.

While the distributor should be designed to operate efficiently under fairly steady state conditions of operation there may be minor upsets in the process. Such upsets may result in a higher amount of polymer melt flowing into the distribution means, or an unexpected degree of expansion of the melt. To deal with this situation and keep the aperture(s) 38 open to the atmosphere within the devolatilizer overflow holes 48 are provided up the side of the tine(s) 36 between the strand forming holes and the apertures. The invention will be further illustrated in the following example.

EXAMPLE 1

In the manufacture of impact polystyrene, about 5% by weight polybutadiene rubber was dissolved in styrene monomer and 5 percent by weight ethyl benzene and polymerized to a conversion in the order of about 80%. The exit temperature from the reactor was 150° C. The polymer is then preheated to 230°-250° C. at a pressure of about 50 psig and is passed to a devolatilization chamber, at a pressure of about 14 mm of Hg and a temperature of 240° C.

In a first series of runs, polymer melt prepared as outlined above was passed through a conventional falling strand device in which polymer melt from the preheater is extruded directly into the top of the devolatilizer in the form of strands. In a second series of runs, polymer melt heated as outlined above but at a pressure of 20 to 30 psig was passed through a preheater then into the distributor of the invention as shown and described in FIGS. 1-4 in a devolatilization chamber at a pressure of 14 mm of Hg and 240° C:

The distributor had a first section with a 10" diameter and the outer tines had 8" diameters. The vents were about 33" long. The 2 inch thick die plate contained 10 tapered holes having a 1" max. diameter tapering over ¼ inch to a minimum diameter of ¾". The central barrel and each of the tines were heated at 240° C. with a hot oil heater as described in the disclosure.

The polystyrene from each run was subjected to conventional chemical analysis for residual styrene monomer and ethyl benzene (EB), (in parts per million) and dimer, trimer and mineral oil in weight percent. Additionally, the gel content (wt %) of the plastic was evaluated by determining the insoluble portion of plastic in a hydrocarbon solvent. The stress strain (tensile properties of the resulting polymer were evaluated using ASTM test procedure D638). The Vicat softening temperature of the resulting polystyrene was determined using ASTM D 1525. The notched IZOD impact for the resulting polystyrene was measured using ASTM D-256 and the melt flow rate (index) of the plastic was determined using ASTM-D 1238 and condition 200/5 (formerly condition 6). The results are set forth in Table 1.

From this table it can be seen that lower amounts of residual sytrene monomer and ethyl benzene were obtained with the preferred distributor of the invention. Also, there were slightly lower concentration of dimer and trimer. None of the product properties was adversely affected when the preferred distributor was used, in fact the product properties were somewhat better.

TABLE 1

|  | Conventional Mean | Preferred Distributor Mean |
|---|---|---|
| Analyses |  |  |
| Styrene Monomer ppm | 1110 | 750 |
| EB ppm | 190 | 65 |
| Mineral Oil weight percent | 5.35 | 5.1 |
| Dimer weight percent | 0.14 | 0.1 |
| Trimer weight percent | 0.67 | 0.61 |
| Gel Content weight percent | 23.0 | 21 |
| Stress Strain Properties |  |  |
| Yield, psi | 2100 | 2356 |
| Fail, psi | 2564 | 2510 |
| Elong. % | 52.8 | 55.4 |
| Modulus, kpsi | 251 | 263 |
| Thermal-Physical |  |  |
| Vicat. °C. | 200.1 | 201.1 |
| IZOD, ⅛" | 1.74 | 1.79 |
| MFI, gm/10 m | 7.96 | 7.82 |

What is claimed is:

1. A horizontal polymer melt distributor used in the upper end of a reduced pressure devolatilizer said distributor comprising:
an inlet means and a die assembly which cooperates with and receives polymer melt from a preheater, said die assembly comprising two oppositely facing flange plates connected about a central die plate said flange plates having essentially equisized central openings therethrough having an inward taper towards said die plate, said die plate bearing a number of holes therethrough connecting the central openings through said flange plates, the total cross sectional area of said holes being less than the minimum cross sectional area of the central openings through said flange plates, a heated enclosed first section having a cross sectional area greater than the minimum cross sectional area of said inlet, said first section opening into at least one subsequent at least partially heated venting and distributing sections which bear on their upwardly facing surface at least one aperture and on their downwardly facing surface strand forming holes permitting the exit of said polymer melt at a rate substantially equal to the rate polymer melt enters said distributor, the total cross sectional area of said one or more subsequent sections being at least equal the cross sectional area of said first section, said first and subsequent sections being adapted so that a substantially linear flow of polymer melt is maintained through out said distributor, with no stagnant areas.

2. The distributor according to claim 1 wherein the holes through said die plate are tapered.

3. The distributor according to claim 2 wherein the shape of said distributor is selected from the group consisting of an annulus, a serpentine, a toroid and a trident.

4. A distributor according to claim 3 wherein said strand forming holes are sized so that the strands of polymer melt descending to the bottom of the devolatilizer are essentially equisized continuous strands.

5. The distributor according to claim 4 wherein said at least one subsequent at least partially heated venting and distributing sections further contain a series of over flow holes located between the at least one aperture and the strand forming holes.

6. The distributor according to claim 5 in the shape of a trident.

7. The distributor according to claim 6 wherein the first section comprises the central arm of the trident and is a barrel heated by a jacket or coil heater.

8. The distributor according to claim 7 wherein the at least one subsequent sections are the outer tines of the trident and comprise closed end tubes having a total cross sectional area from 1.2 to 1.7 times the cross sectional area of the first section which are at least partially heated with bayonet heaters.

9. The distributor according to claim 8 wherein said at least one aperture in said at least one subsequent sections are in the upward surface of the tines facing the inner surface of the devolatilizer and extend at least 50% of the length of said tines.

10. A process for devolatilizing a polymer melt in a reduced pressure devolatilizer comprising pumping said melt through a preheater at a temperature of from 230° to 250°. C. and a pressure from 10 to 30 psig so that the vapor pressure of residual monomer, dimers, trimers and diluent in said melt is greater than the pressure within said preheater; flowing said melt through a horizontal inlet and die plate, which die plate has a number of holes therethrough, the number and diameter of said holes being less than the cross section area of said inlet to maintain a pressure of 10 to 30 psig in said preheater; horizontally flowing said polymer melt into an enclosed first expansion zone in said devolatilizer, said enclosed first expansion zone having a cross-section area greater than said inlet, and at pressure from 5 to 25 mm of Hg and heating said melt to a temperature of from 230° to 250° C. to cause said polymer melt to foam, linearly flowing said melt into at least one subsequent zone having a cross sectional area at least equal to the cross sectional area of said enclosed first expansion zone and having apertures open to the interior of said devolatilizer at a pressure of 5 to 25 mm of Hg to expose the polymer melt foam to the interior of the devolatilizer while heating at least part of the polymer foam to a temperature from 230° to 250° C. and permitting the foam to flow through strand forming holes in the bottom of said subsequent zone at a rate substantially equal to the rate polymer melt flows into said first expansion zone to form a plurality of strands of polymer foam which descend to the bottom of the devolatilizer and pumping said polymer melt from said devolatilizer.

* * * * *